(No Model.)
J. J. TRAINOR.
COMBINED EXCAVATOR AND CONVEYER.
No. 564,727. Patented July 28, 1896.
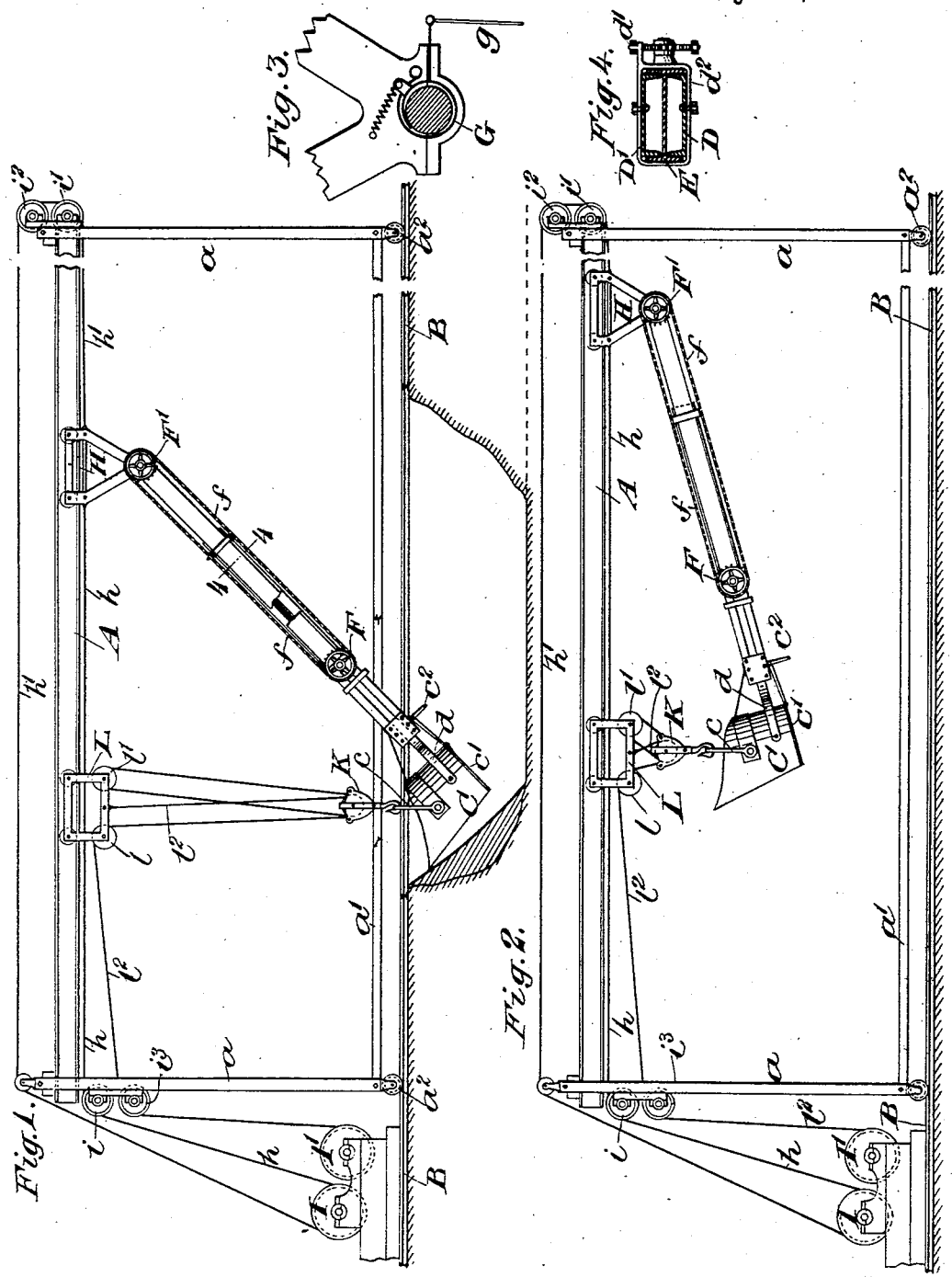
Witnesses:
Fred Haynes
George Barry Jr
Inventor:
John J. Trainor.
by attorneys:
Brown Seward

UNITED STATES PATENT OFFICE.

JOHN J. TRAINOR, OF NEW YORK, N. Y.

COMBINED EXCAVATOR AND CONVEYER.

SPECIFICATION forming part of Letters Patent No. 564,727, dated July 28, 1896.

Application filed December 16, 1895. Serial No. 572,252. (No model.)

*To all whom it may concern:*

Be it known that I, JOHN J. TRAINOR, of the city and county of New York, in the State of New York, have invented a new and useful Improvement in a Combined Excavator and Conveyer, of which the following is a specification.

My invention relates to an improvement in combined excavators and conveyers in which a shovel, provided with an extensible and contractible handle, is mounted upon an overhead support in such a manner as to be conveyed bodily with its load to and from the point where the shovel is loaded.

In the accompanying drawings, Figure 1 represents in side elevation the position of the shovel as it is about completing the taking in of its load. Fig. 2 is a similar view showing the shovel in the position which it assumes when being conveyed along the support. Fig. 3 represents an enlarged view in detail of the brake or clutch for preventing the handle from contracting lengthwise, except when the said clutch is released. Fig. 4 is an enlarged view in detail representing a transverse section through the shovel-handle on the line 4 4 of Fig. 1, looking toward the upper end.

In the form in which I have illustrated my invention it is particularly adapted for excavating trenches, as, for example, for laying a sewer, the soil which is removed in digging the trench being transferred back to a point where the trench is in condition to be refilled and there deposited.

The support consists of a track A, suspended after the manner of a ridge-pole by standards $a$, arranged in pairs at intervals along the track A and spread at their lower ends to straddle the trench, and their upper ends being connected so as to form a stable support for the track and at the same time leave the track exposed between the upper ends of the standards for the carriage to travel freely along on it. The standards $a$ are connected by girders $a'$, extending from each of the members of the next succeeding pair of standards, and for purposes of shifting the support for the excavator from time to time along the line where the excavation is to be made I have found it desirable to provide the lower ends of the standards $a$ with wheels $a^2$, mounted upon rails B laid along the ground on opposite sides of the trench.

The shovel is denoted by C. It is mounted between the arms of the bifurcated end $d$ of the handle and is provided with a bail $c$ to attach thereto at a point nearer its digging edge than its point of support $d$ in the end of the handle.

The handle of the shovel is composed of two longitudinally-sliding sections, the lower one to which the shovel is directly secured consisting of two channel-bars D D', placed with their channels toward each other, as represented in Fig. 4, and spaced apart to receive between them a beam E. The I-beam E has fixed to it, preferably at or near its opposite ends, sprocket-wheels F F', with which there is engaged a sprocket-chain $f$, connected with a pin $d'$ on a sleeve $d^2$, fixed to the sections D D' of the channel-bars, so as to cause them to travel with the chain when the latter is in connection with the hub of the sprocket-wheel F'. There is a brake or clutch G, of any well-known or approved form, which may be operated by a cord $g$, leading down within convenient reach of the operator, so that the handle may be prevented from contracting lengthwise, except when permitted to do so by releasing the brake or clutch. The brake or clutch is, however, so arranged that the handle may extend at pleasure to carry the shovel down to the point where it is to begin its digging.

The upper end of the handle of the shovel is supported from a truck H, mounted on the track A, and the bail $c$ of the shovel is connected by a movable pulley K with a carriage L, also mounted on the track A and provided with a pair of fixed pulleys $l\ l'$.

The truck H is connected by a rope $h$, leading over a guide-pulley $i$, with a winding-drum I under the control of an engine, as is common, and also is connected with the same drum by a rope $h'$, leading in the opposite direction from the rope $h$ to and around guide-pulleys $i'\ i^2$ at a point in the track beyond where it is intended to dump the load and thence back and down to the drum I. This winding-drum I, as it rotates, serves to carry the truck H along the track A in the one direction or the other, according as the drum I is rotated.

A hoisting-rope $l^2$ is connected at one end with the carriage L and leads thence down and around one of the sheaves of the movable pulley K, thence up and around the fixed pulley $l'$, thence down and around a second sheave of the movable pulley K, and thence up and over the fixed pulley $l$ and thence to a guide-pulley $i^3$ and down to a winding-drum I' at the engine.

The carriage L is free to move along the track A to adjust itself to a position above the shovel C as the latter swings from its digging position up into the position shown in Fig. 2 to be transported to the place where it is to be unloaded.

For the purpose of dumping the shovel, it is provided with a gate $c'$ at its rear end, which may be interlocked, as is common, by a handle $c^2$ under the control of the workman at the point where the load is to be deposited.

In operation, the shovel having reached the position over the point where it is to be operated to dig, the hoisting-rope $l^2$ is released and the shovel is permitted to run down into position at the bottom of the trench, the ropes $h$ and $h'$ being in the meantime manipulated to bring the digging edge of the shovel up to its work. The hoisting-rope is then operated and the shovel is forced upwardly with its digging edge engaged with the soil, while its handle is prevented from contracting by the brake or clutch G. After the shovel has been elevated into the position shown in Fig. 2, the winding-drum I is set in motion in a direction to convey the shovel and its handle bodily along the track A to a point where the shovel is to be unloaded, the hoisting-rope $l^2$ being in the meantime let off from the drum I' at such a rate as will hold the shovel suspended and the shovel is then unloaded by opening the gate $c'$. The shovel may then be returned by reversing the drum I to the point where it is to again take on its load and lowered into position, as before explained.

The extensible and contractible handle permits the shovel to be adjusted to dig trenches of varying depths and, if desired, the handle may be shortened after the load is on the shovel and before starting it bodily along its course by simply releasing the brake or clutch G while the shovel is being elevated into the position shown in Fig. 2, thereby bringing the load nearer the truck H and hence nearer the point where the track A ends.

What I claim is—

1. The combination with a track and carriages arranged to travel independently along the track, of a shovel having its handle connected with one of said carriages and the shovel itself connected with the other of the carriages, means for raising and lowering the shovel toward and away from its supporting-carriage, and means for moving the shovel and its handle bodily along the track together with the carriages, substantially, as set forth.

2. A shovel, an extensible handle connected with the shovel and consisting of a pair of channel-bars and an I-bar arranged to slide relatively to one another, means for limiting the sliding movement of said bars and means for transporting the said shovel and handle bodily along from place to place, substantially as set forth.

3. In combination, a shovel, a handle connected with the shovel and consisting of sliding sections, sprocket-wheels connected with one of said sections, a sprocket-chain mounted on the wheels and connected with the other of said sections, a brake or clutch for releasing and arresting said sprocket-wheels and means for conveying the said shovel and its handle bodily from place to place, substantially as set forth.

JOHN J. TRAINOR.

Witnesses:
FREDK. HAYNES,
IRENE B. DECKER.